United States Patent [19]

Mountain

[11] 4,324,227
[45] Apr. 13, 1982

[54] SOLAR HEAT COLLECTING PANEL

[76] Inventor: John F. Mountain, 1175 Norton, Idaho Falls, Id. 83401

[21] Appl. No.: 73,094

[22] Filed: Sep. 6, 1979

[51] Int. Cl.³ .............................................. F24J 3/02
[52] U.S. Cl. .................................. 126/437; 126/440; 126/445; 165/170
[58] Field of Search ............... 126/430, 425, 436, 437, 126/435, 450, 400, 446, 447, 440; 165/170

[56] References Cited

U.S. PATENT DOCUMENTS

| | | | |
|---|---|---|---|
| 2,064,345 | 12/1936 | Hodgson | 126/434 |
| 3,929,121 | 12/1975 | Rogers | 126/440 |
| 3,981,295 | 9/1976 | Minnick | 126/440 |
| 4,010,731 | 3/1977 | Harrison | 126/436 |
| 4,066,062 | 1/1978 | Houston | 126/440 |
| 4,071,016 | 1/1978 | Henderson | 126/400 |
| 4,085,731 | 4/1978 | Weir | 126/440 |
| 4,186,720 | 2/1980 | Schmauder et al. | 126/445 |
| 4,187,831 | 2/1980 | Eubank | 126/435 |
| 4,205,661 | 6/1980 | Chapman | 126/440 |

FOREIGN PATENT DOCUMENTS

| | | | |
|---|---|---|---|
| 159933 | 3/1921 | United Kingdom | 165/170 |
| 375685 | 6/1932 | United Kingdom | 126/440 |

Primary Examiner—James C. Yeung
Attorney, Agent, or Firm—Mallinckrodt & Mallinckrodt

[57] ABSTRACT

A solar panel unit for heating circulating fluid has a plurality of preferably rectangular lenses for focusing and concentrating the sun's energy onto a heat-absorbing body through which a heat-exchange fluid is circulated.

3 Claims, 4 Drawing Figures

SOLAR HEAT COLLECTING PANEL

BACKGROUND OF THE INVENTION

1. Field:

The invention is in the field of panels for collecting solar energy in the form of heat and transferring it to a heat exchange fluid for either immediate use or for storage for future use.

2. State of the Art

During the last several years, interest in solar energy has increased enormously and there are many designs for panels for collecting heat energy from the sun and transferring such collected heat energy to a heat exchange fluid for immediate use or from which the heat is extracted for storage.

Most present panels for absorbing solar heat energy contain a heat absorbing material which is exposed to direct sunlight and over, around, or through which, a heat exchange fluid is passed to absorb heat therefrom. Such panels absorb energy from direct incidence of the sun's rays and are thus somewhat limited in the temperature they can obtain and in their efficiency. Such panels do not utilize means for concentrating or magnifying the sun's energy.

A heat collecting panel that utilizes means for magnifying the sun's energy is illustrated in U.S. Pat. No. 4,071,016 which shows a panel of triangular cross section having a series of magnifying glasses arranged to focus the sun on a heat absorbing material over which a stream of air is blown in order to absorb the heat from the heat-absorbing material. The panel structure is essentially air tight, so that the air blown into the chamber exits through a hot air duct and is then used.

All prior art systems leave much room for improvement in the amount of energy collected and in the efficiency of such collection.

SUMMARY OF THE INVENTION

According to the invention, a solar panel unit for heating circulating fluid includes a plurality of lenses for focusing and concentrating the sun's energy onto a heat-absorbing body. An enclosed channel passes through the heat-absorbing body and heat exchange fluid is passed through such channel. Structure is provided for supporting the heat-absorbing body and for supporting the lenses in such a manner that sunlight striking the lenses is focused upon the heat-absorbing body. Means are also provided for positioning the panel unit so that sunlight falls upon the lenses during normal daylight hours.

In one arrangement of the invention, the solar panel is associated with a heat exchange fluid storage tank containing heat storage material, such as pieces of granite rock and with piping and a pump so that the heat exchange fluid is pumped from the tank through the heat-absorbing body and back into the tank, or so that the heat exchange fluid may be circulated from either the tank or the heat-absorbing body for immediate use, such as in a furnace or hot water heater.

THE DRAWINGS

In the accompanying drawings, which represnt the best mode presently contemplated for carrying out the invention:

FIG. 1 is a pictorial view of a heat collection and storage system according to the invention showing a pump and storage tank as well as the solar panel unit;

FIG. 2, a vertical section through the solar panel unit of the invention, taken on line 2—2 of FIG. 1 and drawn to a larger scale;

FIG. 3, a top plan view of the heat-absorbing body and supporting structure, taken on line 3—3 of FIG. 2 and drawn to a smaller scale; and FIG. 4, a vertical section taken through the heat-absorbing body and supporting structure on line 4—4 of FIG. 3 and drawn to the scale of FIG. 2.

DETAILED DESCRIPTION OF THE ILLUSTRATED EMBODIMENT

Figure 1:
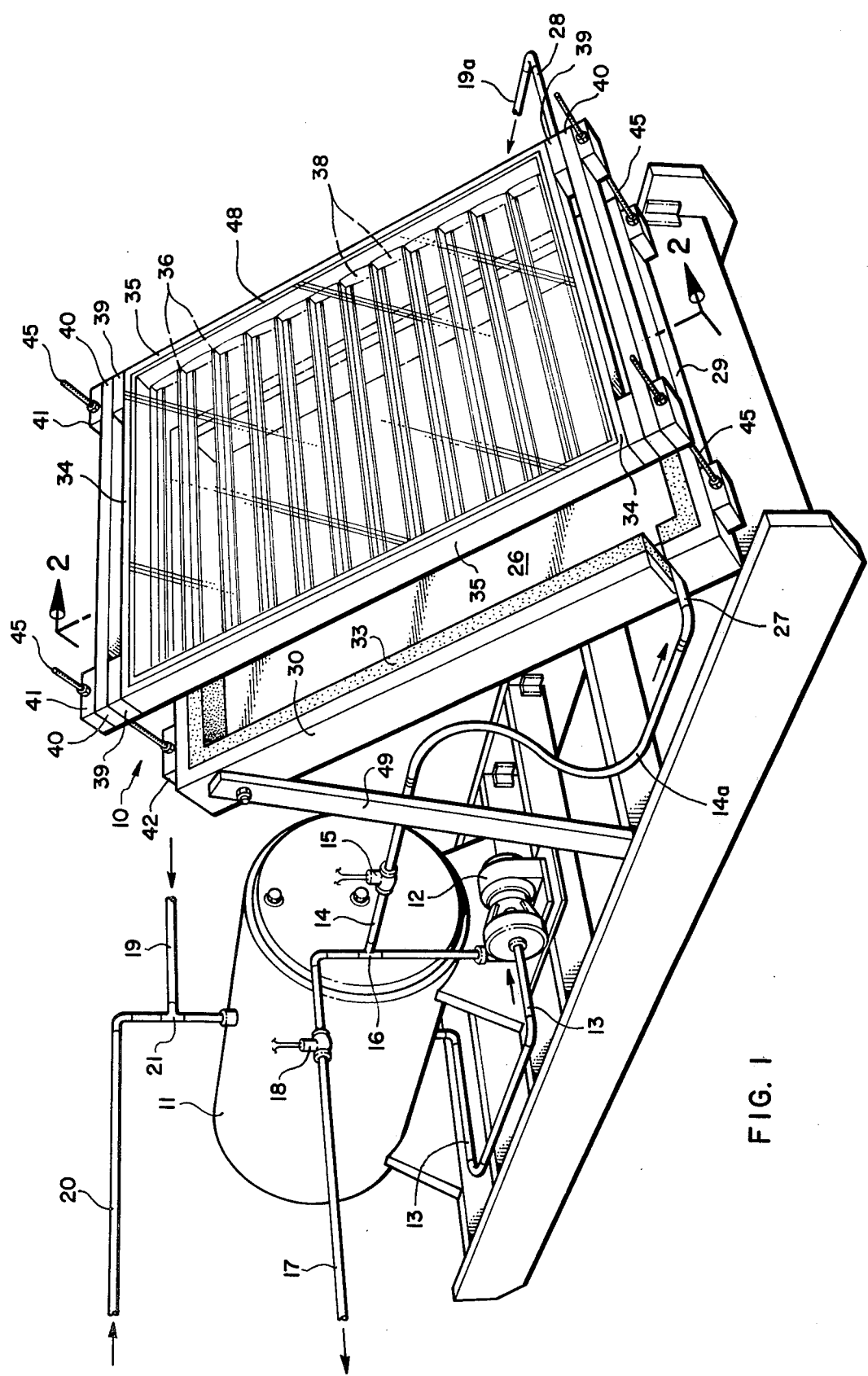

The solar heating system illustrated in FIG. 1 comprises a solar panel unit 10 for heating a circulating fluid, a fluid storage tank 11, a fluid pump 12, and piping between the pump, storage tank, and solar panel unit for circulation of fluid. Fluid is drawn from tank 11 through pipe 13 by pump 12. Fluid from pump 12 is forced into pipe 14, through which, if valve 15 is open, it is directed to solar panel unit 10 for circulation therethrough. A tee 16 in pipe 14 provides connection to pipe 17, through which, if valve 18 is open, fluid is provided to the location where such fluid is to be used. This may be to a heat exchange unit in a forced air furnace, a radiator heating system, a heat exchange unit in a hot water tank, or to various other types of equipment where the heated fluid may be advantageously used.

Fluid from the solar panel unit 10 is circulated back to storage tank 11 through pipe 19. Fluid that has been used by the furnace or other item is returned to tank 11 through pipe 20 which interconnects with pipe 19 at tee 21.

Valves 15 and 18 are preferably electrically controlled valves so that they can be controlled remotely and automatically. Valve 15 will be open at any time that enough energy from the sun is striking the solar panel unit to make the temperature of the fluid leaving the unit through pipe 19 greater than the fluid entering the unit through pipe 14, i.e. the fluid leaving storage tank 11. This determination will preferably be made automatically by temperature sensors in the output pipe 19 from the panel unit 10 and either in the storage tank 11 or in pipe 13 leading therefrom and by a comparitor to which the outputs of the temperature sensors are connected. Temperature sensors and comparator units are well known, form no part of applicant's invention, and are thus not described in detail. Valve 18 will be open at any time heated fluid is needed by the equipment in which such fluid is utilized and may be controlled by, for example, a thermostat in a building to be heated or a thermostat in a water heater. Pump 12 will be controlled so that it operates only when either one or both of valves 14 and 18 are open to allow fluid flow from the tank.

Although solar panel unit 10, storage tank 11, and pump 12 are illustrated as located together as a unit on a frame 22, the various components of the system could be separated and placed at various locations. To reduce heat loss, it is preferred that tank 11 and all piping be insulated, such as by being covered by a layer of foam insulation. It is also preferred that storage tank 11 have a capacity of at least 300 gallons, and that about half of the volume of the tank be taken up by pieces of granite or other material which have high heat storage capacity.

In the form illustrated, the solar panel unit 10 has a heat-absorbing body 23 with an enclosed channel 24 therein through which heat exchange fluid is passed. The channel 24 may conveniently run back and forth along the length of the heat-absorbing body in a series of side-by-side passages, each passage being connected at one end with one of the adjacent passages and at the other end with the other of the adjacent passages so that one continuous channel through the body is formed. Such construction may be accomplished by sealing the ends of a series of rectangular tubes attached adjacent one another with corresponding adjacent edges cut out so that a continuous channel is formed, or, as illustrated, by attaching as by welding, a series of steel angles 25 to a steel plate 26 having one set of opposite edges 26a, and an edge 26b bent downwardly.

Alternate end portions of the angle legs 25a are cut out to form passages 25b through angle legs 25a. In this way, a continuous channel 24 is formed, as illustrated.

Inlet pipe 27 is attached about an inlet opening in outside angle leg 25a, to form an inlet for channel 24, and an outlet pipe 28 is attached about an outlet opening in plate edge 26b, to form an outlet for channel 24. Pipes 27 and 28 are preferably threaded on their ends, so that they may be easily connected to pipes 14 and 19, respectively, FIG. 1. The upper surface of plate 26 is preferably blackened or otherwise specially treated so that it absorbs as much heat as possible from the sun light striking it.

Heat-absorbing body 23 is held and supported by a rectangular, open, box framework comprising upstanding sets of opposite peripheral walls 29 and 30 and bottom 31. This framework may conveniently be built of wood in standard fashion and, when of wood, is provided with a bottom sheet 32 and upstanding peripheral wall liners 33 of insulation, upon and against which the heat-absorbing body rests. The insulation is preferably two inch thick plastic foam of a type that may be purchased in sheets at building supply stores.

Figure 2:
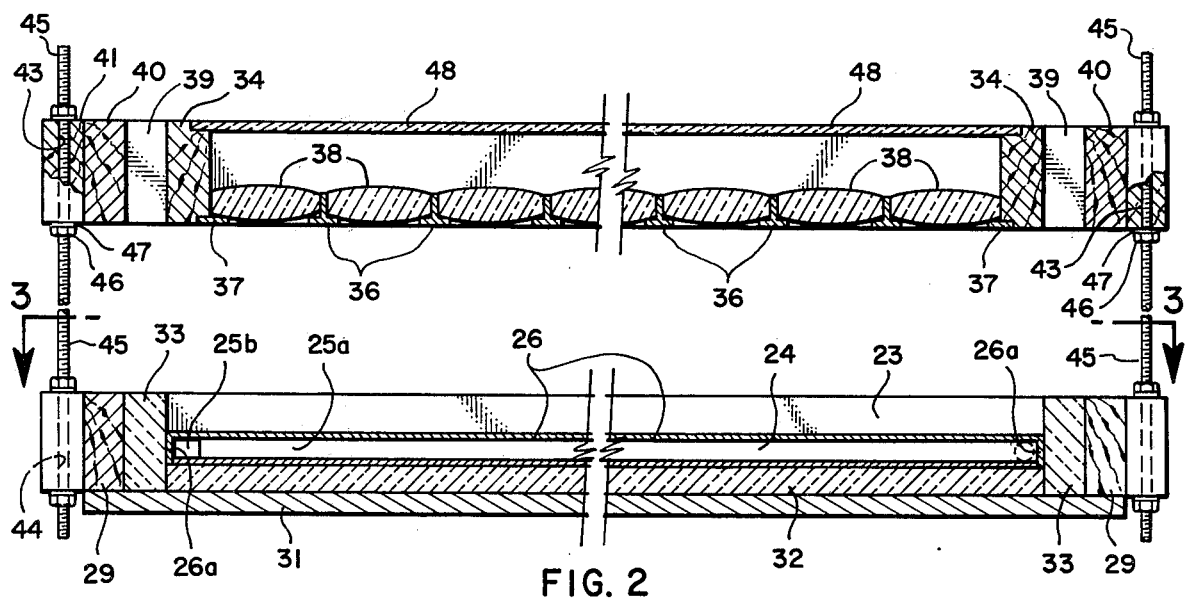
Figure 3:
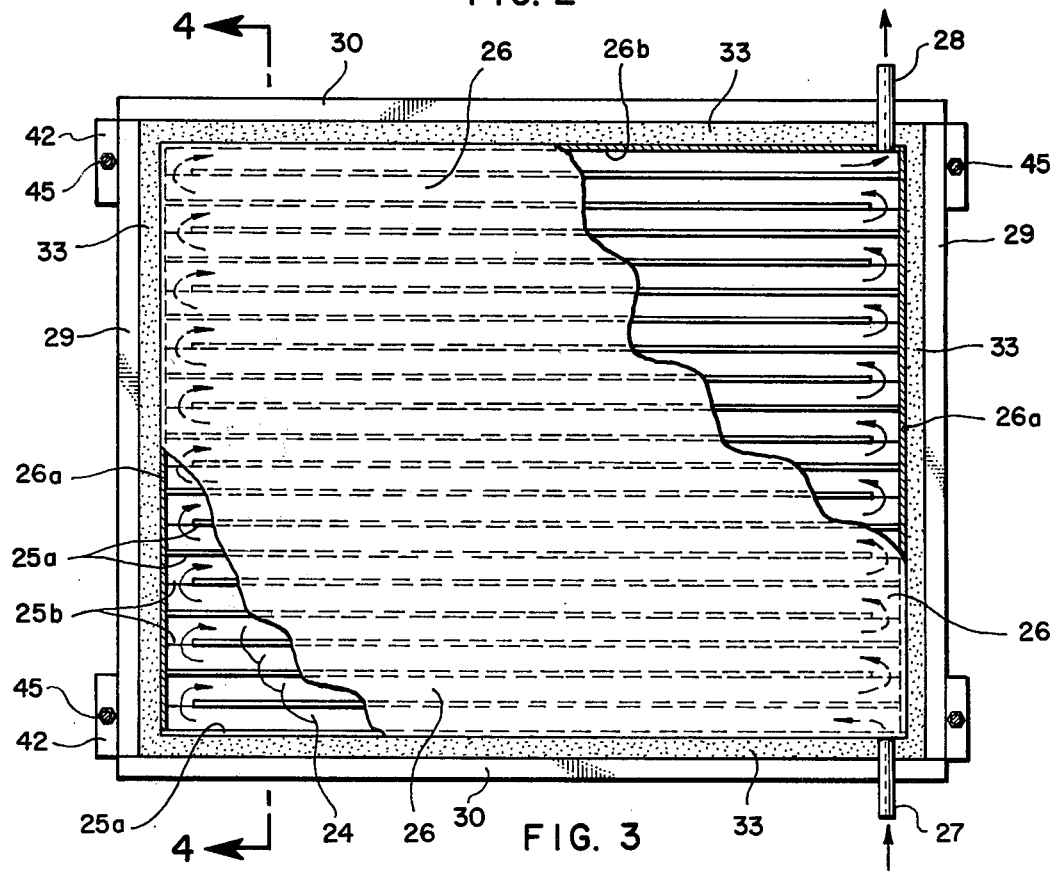
Figure 4:
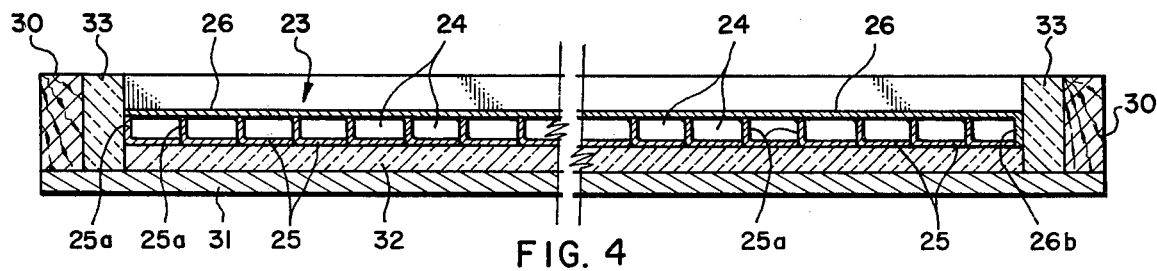

A rectangular lens supporting frame comprises opposite sets of peripheral walls 34 and 35, FIGS. 1 and 2. Secured between opposite walls 35 are a plurality of spaced apart structural T's 36, arranged with the cross portion of each T along the bottom edge of the walls. Opposite walls 34 have strips 37 secured along the inside edges thereof, so as to correspond with the bottom cross portions of the T's. In this manner, supports are formed for rectangular lenses 38.

The length dimension of the lens-supporting frame is slightly smaller than that of the supporting frame for the heat-absorbing body. In order to make up this difference so that the length dimension of the two frames is the same, spacer blocks 39 and spacer walls 40 are added to walls 34. Blocks 41 are attached to spacer walls 40 and correspond to blocks 42 attached to walls 29 of the supporting frame for the heat-absorbing body. Blocks 41 and 42 have corresopnding holes 43 and 44 respectively drilled therethrough to receive threaded rods 45. Nuts 46 and washers 47 secure the two supporting frames in spaced apart relationship. The distance between the two frames is easily adjusted by adjusting appropriate nuts 46. Once the distance between the lenses and the heat-absorbing mass has been set for the focal length of the lenses, no further adjustment should be needed. Thus, if desired, the two frames could be rigidly mounted rather than adjustably mounted.

In use, solar panel unit 10 is positioned so that light from the sun will fall directly on lenses 38. The lenses are spaced from the heat-absorbing body such that the light from the sun falling on lenses 38 is focused onto heat-absorbing body 23. The focused sunlight is much hotter than unfocused sunlight would be and heats heat-absorbing body 23 to a temperature much higher than that which would be obtained if sunlight fell directly on it.

The currently preferred lenses are rectangular in shape in one plane, being between four and eight inches in width and forty to fifty inches in length. The lenses have a magnification power of between eight and ten and a focal length of about ten inches. Rather than the rectangular lenses illustrated, the normal round "magnifying glass" lenses could be arranged side-by-side in the lens-supporting frame and would work satisfactorily. The reactangular lenses are preferred because they can be arranged in the lens-supporting frame in side-by-side relationship without any wasted space between them (adjacent round lenses touch at one point and have space between them), so they magnify more of the sunlight hitting the rectangular area of the supporting frame. Square or rectangular Fresnel lenses may also be used.

The lenses may be of glass or plastic, and, particularly when of glass, a sheet of transparent plastic 48 is secured to the lens-supporting frame over the lenses to protect them from thrown or falling objects, such as rocks, and also from water which could cause a hot glass lens to break.

The system is designed to operate at temperatures above the boiling point of water. Therefore, a special heat exchange fluid that has a high boiling point must be used. Also, since the system may be located out-of-doors in cold climates, the heat exchange fluid should have a low freezing point. A synthetic heat exchange fluid such as Caloria HT 43 made by Exxon Corporation has been found to be very effective. This fluid is designed for heat transfer uses, has high heat absorbing and retaining properties, does not freeze even under temperatures likely to be encountered at night in cold winter climates, and does not boil until about 600° F.

The pump 12 used in the system has to be able to operate at high temperature. A positive displacement, rotary gear pump made by North American Rockwell Corporation with 5.4 gallon per minute capacity and "Teflon" seals has been found satisfactory. Such pump is powered by a one-quarter horsepower General Electric motor that operates at 1200 RPM.

The solar panel unit in the system shown is hinged at one end to the supporting frame 22, so that it can be raised or lowered by moving supporting strut 49. In this manner, the solar panel unit can be periodically adjusted to be perpendicular to the noon rays from the sun at different times of the year. Flexible hose portion 14a and 19a of pipes 14 and 19, respectively, allow for such movement of panel 10.

The lenses are arranged so that as the sun moves across the sky, the rays striking the lenses will be focused onto the heat-absorbing body throughout such movement. However, the exact location of the focused sun light on the heat-absorbing body will move somewhat as the sun moves.

The increased temperature of the heat-absorbing body which results from use of the lenses to focus the sunlight results in advantages over systems not using focused sunlight. These advantages are higher efficiency of heat transfer from the heat-absorbing body to the heat-exchange fluid, higher temperature of the heat exchange fluid itself, higher heat storage capacity because of the higher temperature, and more efficient use of the heated fluid because of its higher temperature.

In instances or climates where the fluid in the system is likely to heat to a temperature above its boiling point, shutters may be provided in connection with a thermostat so that they close and block the sunlight from the lenses when the fluid nears its boiling point. Other types of safety systems could also be used.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A solar heat collection and storage system, comprising a solar panel unit for heating circulating fluid, including a heat-absorbing body having an enclosed channel therethrugh for passage of heat exchange fluid, said passage having an inlet end and an outlet end, structure supporting said heat absorbing body, a plurality of lenses for focusing the sun's energy, and structure supporting said lenses in relation to the heat-absorbing body so that sunlight striking said lenses is focused upon said body; means for positioning said panel unit so that sunlight falls upon said lenses; a storage tank for heat-exchange fluid; heat storage means within said storage tank; first conduit means for connecting said storage tank with the inlet for said passageway in the heat absorbing body so that fluid to be heated is directed to the heat absorbing body; second conduit means connecting said first conduit means to external equipment which can utilize heated fluid; third conduit means for connecting said storage tank with the outlet for said passageway to return heated fluid to the storage tank; fourth conduit means connecting the external equipment to either the storage tank or the third conduit means, for returning fluid from the external equipment to the storage tank; pump means in the first conduit for forcing fluid from the tank through the first conduit; first control valve means located in the first conduit between the connection to said second conduit means and the inlet to the passageway; second control valve means located in the second conduit; and control means for opening said first valve when the temperature of the fluid toward the outlet of the passageway is greater than the temperature of the fluid leaving the storage tank, for opening the second valve when fluid is needed by the external equipment, and for causing operation of the pump means whenever one of the valves is open.

2. A solar heat collection and storage system according to claim 1, wherein the solar panel unit, storage tank, conduit means, and pump means are located on a single framework as a self-contained unit, external connections to the unit being made for directing the heat-exchange fluid to external uses.

3. A solar heat collection and storage system according to claim 1, wherein the heat storage means within the storage tank is a plurality of pieces of granite and wherein the storage tank and the conduit means are coated with a layer of insulation to reduce heat loss therefrom.

* * * * *